United States Patent [19]

Falk

[11] Patent Number: 4,482,015

[45] Date of Patent: Nov. 13, 1984

[54] SELECTIVELY PLUGGING SUBTERRANEAN FORMATIONS WITH A HYDROCARBON SOLUBLE FLUID

[75] Inventor: David O. Falk, Denver, Colo.

[73] Assignee: Marathon Oil Company, Findlay, Ohio

[21] Appl. No.: 484,759

[22] Filed: Apr. 14, 1983

[51] Int. Cl.³ .............................................. E21B 43/12
[52] U.S. Cl. .................................... 166/288; 166/295
[58] Field of Search ............... 166/288, 294, 295, 300; 523/130

[56] References Cited

U.S. PATENT DOCUMENTS

| | | | |
|---|---|---|---|
| 2,649,159 | 8/1953 | Boyer | 166/295 |
| 2,754,274 | 7/1956 | Boyer | 166/295 |
| 3,305,017 | 2/1967 | Dollarhide | 166/295 |
| 3,306,356 | 2/1967 | Sparlin | 166/295 |
| 3,373,812 | 3/1968 | Smith | 166/295 |
| 3,495,412 | 2/1970 | Sakata et al. | 61/36 |
| 3,956,140 | 5/1976 | Nahm et al. | 252/8.5 |
| 4,210,106 | 7/1980 | Ely et al. | 166/294 |

FOREIGN PATENT DOCUMENTS 722760  11/1965  Canada .................................. 166/295

Primary Examiner—Stephen J. Novosad
Assistant Examiner—William P. Neuder
Attorney, Agent, or Firm—Jack L. Hummel; Rodney F. Brown

[57] ABSTRACT

Highly permeable zones in a subterranean formation vertically bounded by a relatively less permeable zone are selectively plugged by injecting an emulsion of melamine and formaldehyde in an alcohol medium via a well into the highly permeable zones. The emulsion is hydrocarbon soluble are preferentially envelops the highly permeable zones where it reacts to form a resin at a temperature of from about 80° C. to about 250° C. and a pH of from about 7 to 12 and over a period of from about 1 to 4 days. The resulting resin substantially plugs the highly permeable zones in the formation.

14 Claims, 1 Drawing Figure

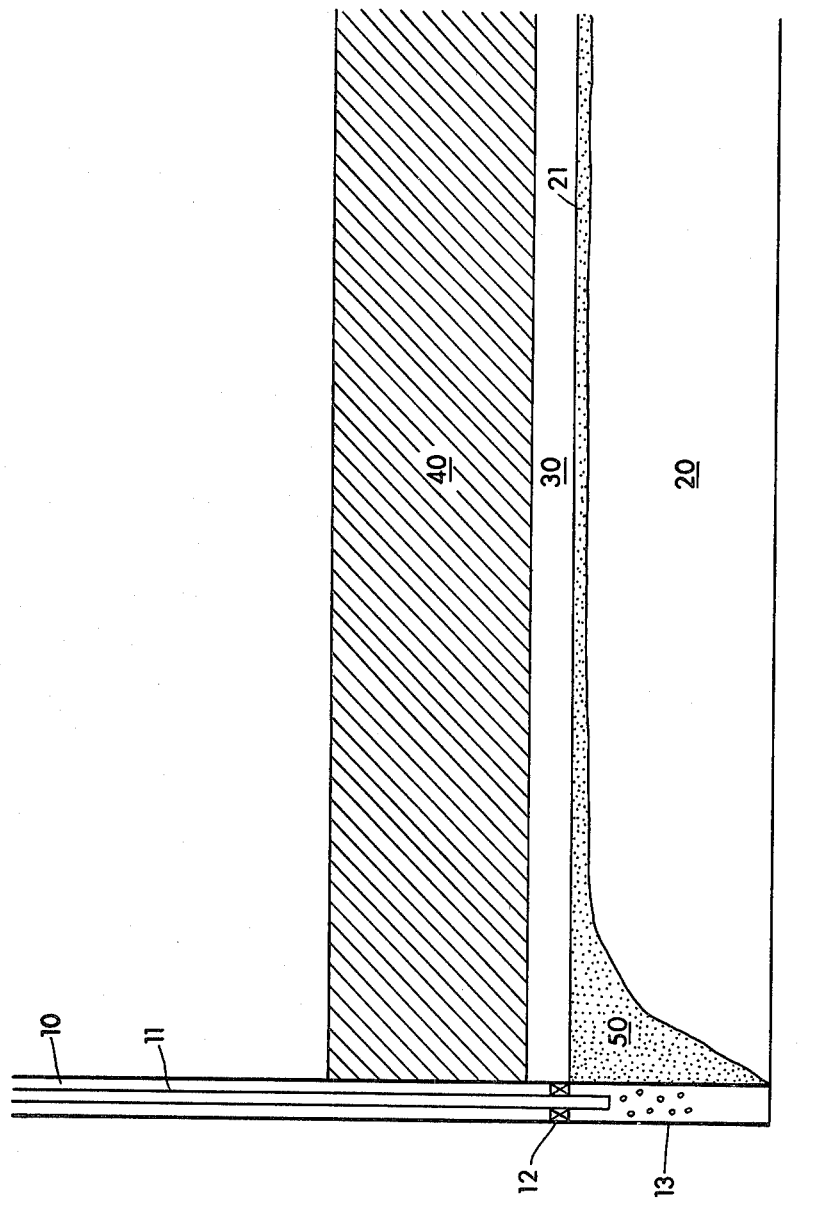

SELECTIVELY PLUGGING SUBTERRANEAN FORMATIONS WITH A HYDROCARBON SOLUBLE FLUID

DESCRIPTION

1. Technical Field

The invention relates to a process for selectively plugging highly permeable zones in a subterranean formation with a melamine resin.

2. Background Art

Fluids preferentially migrate into the highly permeable zones of subterranean formations. This migration is undesirable when injecting treatment fluids into hydrocarbon-bearing formations for post-primary recovery of residual hydrocarbons. The treatment fluids channel through the highly permeable zones bypassing the less permeable zones. The result is poor conformance and flow profiles of the treatment fluid in the formation. The hydrocarbons residing in the less permeable zones are not produced and the overall yield of hydrocarbons from the formation is reduced.

Highly permeable zones in subterranean formations are plugged to prevent migration of treatment fluids into them and to divert treatment fluids into adjacent, less permeable zones. One plugging method is to inject plugging fluids into the formation prior to treatment fluids. The fluids preferentially enter and plug the highly permeable zones. Subsequently injected fluids are diverted into less permeable zones, facilitating recovery of hydrocarbons therein.

Prior art processes teach water soluble plugging fluids. A water soluble plugging fluid is injected into a formation via a well and displaces the connate water away from the well bore. Once the fluid is in place it forms a plug in the area formerly occupied by the connate water.

U.S. Pat. No. 3,956,140 to Nahm et al teaches the addition of water soluble condensation products to drilling fluids to improve the fluid loss characteristics of the drilling fluid. Phenol, formaldehyde and sulfite salts react to produce condensation products, which may be modified by adding nitrogen-containing compounds such as melamine and urea. U.S. Pat. No. 3,495,412 to Sakata et al teaches an in situ process for reducing the permeability of soil. A three-component aqueous solution comprising urea, formaldehyde and polyvinyl alcohol is injected into the soil where it is cured with an acidic substance to form a resin plug. U.S. Pat. No. 4,210,206 to Ely et al teaches a high temperature well treating process. High molecular weight polyacrylamides are cross-linked with water soluble melamine formaldehyde resins in situ to form a thermally stable gel which temporarily blocks the formation.

A process is needed whereby a hydrocarbon soluble plugging fluid only penetrates the periphery of a permeable water-containing zone minimizing the quantity of fluid necessary to plug the water-containing zone. A process is further needed whereby the strength and permanence of the resulting plug is enhanced as the formation temperature increases.

DISCLOSURE OF INVENTION

The present invention provides a process for selectively plugging highly permeable zones in a subterranean formation bounded by relatively less permeable zones with a melamine resin. The melamine resin is formed in situ by injecting the resin components into the highly permeable zones and heating them.

The resin components are melamine, formaldehyde and a hydrocarbon soluble alcohol. The alcohol acts as a fluid medium, which transports the resin components into the highly permeable zones. The alcohol may be incorporated into the network resin structure if it contains multiple hydroxyl groups. Other high molecular weight hydroxyl-containing compounds added to the injected fluids may also become part of the resin network upon resinification.

The resin is formed by dissolving solid melamine in a formaldehyde solution at room temperature and basic pH followed by continuous mixing. The resulting water soluble solution is mixed with a hydrocarbon soluble alcohol to form a hydrocarbon soluble emulsion. Hydroxyl-containing compounds may then be added to the emulsion to modify the physical properties of the produced resin.

The emulsion is immediately injected into the highly permeable, water-containing zone to be treated via a well. The highly permeable zone is vertically bounded by a relatively less permeable zone which separates the water-containing zone from a highly permeable hydrocarbon-containing zone. The emulsion is hydrophobic and less dense than the connate water. The injected emulsion migrates vertically and radially from the near well bore along the periphery of the water-containing zone. The emulsion preferentially migrates radially along the upper interface with the relatively less permeable zone. The emulsion envelops rather than substantially penetrates the highly permeable, water-containing zone.

The emulsion reacts in place at high temperature to form a resin product. The reaction temperature range is from about 80° C. to 250° C. If the temperature of the formation water is near the lower limit of the range, the reaction proceeds at a relatively slow rate. However, the rate may be increased by injecting steam into the formation ranging in temperature from about 100° C. to 250° C. Acidifying the reaction also increases the resin formation rate. The reaction is acidified by injecting an acid, which reduces the pH of the formation fluids from 7 to about 5.

Within the above range of reaction parameters the emulsion sets to a hard resin which permanently seals off the highly permeable, water-containing zone. The clear resin is insoluble in the formation fluid. It is thermally stable and is cured by continued exposure to high temperature.

Once the resin plug is formed, additional treatment fluids are injected into the hydrocarbon-bearing formation to enhance recovery of hydrocarbons therefrom. The resin diverts the treatment fluids away from the water-containing zone into the hydrocarbon-containing zones.

The plugging process described herein utilizes the hydrophobicity of the hydrocarbon soluble emulsion to minimize the amount of fluid necessary to plug the water-containing zone. In contrast a water soluble fluid would fully penetrate the water-containing zone before effectively plugging the zone, requiring a larger, less economical amount of fluid than the present invention to effect the same result.

The instant process is particularly advantageous when used in conjunction with a steam flood recovery process. Steam injection enhances both resin formation and hydrocarbon recovery. The resin components are readily injected into the formation without premature resin formation, because the resin does not form until it reaches the relatively high reaction temperature in situ. The steam flood is high temperature, which initiates resinification and increases its rate. Continued contact between the high temperature steam and the produced resin hardens the resin permanently plugging the water-containing zone. Without the resin barrier at the interface, injected high temperature steam would avoid the hydrocarbon-bearing zone by penetrating the relatively less permeable zone and entering the highly permeable, water-containing zone.

BRIEF DESCRIPTION OF THE DRAWING

FIG. 1 is an illustration of a formation penetrated by a well, which contains three distinct zones and a resin plug of the highly permeable, water-containing zone.

BEST MODE FOR CARRYING OUT THE INVENTION

The present invention relates to a process for selectively plugging highly permeable zones in a subterranean formation bounded by relatively less permeable zones with a non-flowing resin, which is insoluble in the formation fluids. The process comprises combining melamine and formaldehyde in an alcohol medium under alkaline conditions. The resulting hydrocarbon soluble emulsion is injected into the highly permeable, water-containing zones where it reacts at high temperature to form a non-flowing insoluble resin. The resin remains rigidly and permanently in place under the elevated thermal conditions of the formation.

A resin is an amorphous, water insoluble solid. The resin components are linked by chemical bonds in a dense but random network to form a single large molecular mass. The resin produced herein is comprised of melamine, formaldehyde and an alcohol.

The alcohol represents the continuous phase of the hydrocarbon soluble emulsion. The alcohol is more hydrocarbon soluble than water soluble. It is either a monohydric alcohol or a polyhydric alcohol containing about 6 or more carbon atoms. Monohydric alcohols include benzyl alchol, cyclohexanol, hexanol, heptanol, octanol, etc. Polyhydric alcohols include glycols and glycerol.

Additional compounds may also be added to the emulsion. Such compounds include high molecular weight hydroxyl-containing compounds such as simple sugars and partially hydrolyzed polyacrylamide. Other additives include amine-containing compounds, such as unhydrolyzed polyacrylamide, urea and thiourea, and formaldehyde reacting phenols.

The resin components are combined by first adding solid melamine to a concentrated formaldehyde solution. Melamine is not readily soluble in the formaldehyde solution. The resin components may be injected into the formation as a slurry and thereafter dissolving the melamine in situ. However, the melamine is preferably dissolved in the formaldehyde above ground by continuous mixing at ambient atmospheric temperature, about 20° C., and basic pH. The melamine dissolves in about 15 to 18 hours to form a water soluble solution. The dissolution rate may be increased by raising the temperature and adding a basic catalyst. Basic catalysts include basic organic compounds, basic inorganic hydroxide compounds or basic buffer compounds, such as sodium hydroxide, inorganic and quaternary ammonium hydroxides, sodium phosphate buffer, etc. The pH of the solution is adjusted from about 7 to 12 and preferably about 8 to 9.

The resulting hydrophilic solution is mixed with alcohol to form the emulsion. The emulsion is relatively hydrophobic and hydrocarbon soluble. The initial concentrations of melamine and formaldehyde in the emulsion are such that the moles of formaldehyde exceed the moles of melamine. It is preferred that the molar ratio of formaldehyde to melamine initially present in the emulsion is at least about 2:1. The weight percent concentration of melamine initially present in the emulsion is from about 0.5% to 10% and preferably about 1% to 2%. The most preferred concentration is about 2%. The concentration of formaldehyde is from about 0.5% to 10% and preferably about 1% to 2%. The most preferred concentration is about 2%.

About 10 to 100 barrels of the above-described emulsion is prepared for injection into the formation. The amount of emulsion required to plug the zone is dependent on the particular characteristics of the formation. A practitioner of ordinary skill in the art can determine the amount of emulsion necessary to plug the zone given the characteristics of the formation. A larger amount of water soluble emulsion would be required to plug the zone than hydrocarbon soluble emulsion, if used in the instant process.

Prior to injecting the emulsion, the pH may be readjusted in a range of from about 7 to 12 and preferably about 8 to 9 by adding more basic compound. The emulsion is immediately injected thereafter via a tubing string 11 penetrating a well bore 10 as shown in FIG. 1. The emulsion enters the highly permeable water-containing zone 20 of the formation, which is bounded by a relatively less permeable zone 30, through perforated casing 13. The emulsion is injected at a rate of from about 100 to 400 barrels per day. The preference of the emulsion to enter the highly permeable zone 20 can be ensured by the use of a packer 12. The emulsion enters the highly permeable zone 20 and preferentially migrates from the near well bore to the interface 21 between the highly permeable zone 20 and the vertically adjacent relatively less permeable zone 30.

The emulsion reacts in place to form a resin plug 50 at a temperature of from about 80° C. to 250° C. and preferably about 100° C. to 200° C. The natural formation temperature does not generally surpass the low end of this range, about 90° C. Therefore it may be necessary to raise the formation temperature by injecting steam. Resin formation is not initiated until the reactants reach the reaction temperature.

Once resin formation is initiated, the rate can be increased by reducing the pH of the formation fluid. An acid such as hydrochloric acid is injected into the highly permeable zone until the pH of the fluids is from about 7 to about 5.

Reaction time is a function of the reaction temperature, pH and concentration of the reactants. The reaction time is determined by fixing the parameters listed above within their respective range of values such that the reaction time is from about 1 to 4 days and preferably about 1 to 2 days. The viscosity of the emulsion increases as the reaction progresses.

The non-flowing resin is insoluble in the formation fluids and permanently plugs the highly permeable water-containing zone 20 of the formation. The plug 50 isolates the water-containing zone 20 thereby preventing migration of fluids into and out of zone 20. Subsequent treatment of the adjoining hydrocarbon-bearing zone 40 is accomplished by injecting post-primary treatment fluids such as steam, polymer, micellar/polymer, water, etc.

The mechanism for resin formation is believed to be four steps:
(1) methylolation of the melamine by formaldehyde;
(2) condensation of the methylolated melamine by alcohol;
(3) removal of the alcohol from the condensation product under high temperature and low pH; and
(4) condensation of the melamine to form the network resin.

Methylolation of the melamine is the initiation step for resin formation. The melamine is converted to a water soluble methylolated intermediate in an alkaline aqueous solution. The melamine is methylolated at its amine sites to produce either the stable intermediate hexamethylolmelamine or the less stable intermediate trimethylolmelamine. The relative proportion of intermediates produced is dependent on the formaldehyde concentration. A high formaldehyde concentration favors a high proportion of hexamethylolmelamine while a low formaldehyde concentration favors in a high proportion of trimethylolmelamine in the solution. The methylolation of melamine and subsequent dissolution of the methylolated intermediates requires about 15 to 18 hours at room temperature with continuous mixing. The dissolution time may be reduced by raising the temperature of the solution.

The second step of the resin formation reaction is condensation of the intermediates by a monohydric alcohol. The intermediates are highly reactive at the methylolated sites. The methylolated branches react with the hydroxyl group of the alcohol to form ether bonds by the condensation of water. The resulting intermediate is characterized by a central melamine group with alcohol constituencies extending from the branched amines. The alcohol constituencies are chain terminators, which are unreactive with other methylolated melamine groups.

In the final two steps the alcohol constituencies are removed from the melamine intermediates by high temperature and acid catalyst and the methylolated melamines link together at the ether bonding sites to form the network resin.

Where the continuous phase of the emulsion is a polyhydric alcohol, some of the alcohol constituencies are retained by the melamine during steps 3 and 4 and become part of the network resin. Polyhydric alcohols have multiple hydroxyl groups, which enable them to link one or more melamines together in a chain to propagate the network resin formation. Likewise other components containing amine or hydroxyl groups may be added to the emulsion, which are methylolated and linked with the melamine in the network resin structure to modify the properties of the melamine resin.

The present process is not to be limited by the particular mechanism described herein. The possible structures of the polymer resin are provided above to illustrate certain types of structures that can occur within the produced resin. By practicing the process of the invention other resin structures can be produced, which are within the scope of this invention.

The following example is illustrative of the present invention and is not to be construed as limiting the scope thereof.

EXAMPLE

A reservoir penetrated by a well contains three relatively distinct vertical zones: an upper zone containing 75% heavy hydrocarbon with a permeability of 1000 millidarcies (md), an intermediate zone containing equal parts of water and hydrocarbon with a permeability of 10 md, and a lower zone containing substantially all water and a permeability of 1000 md. The formation water has a temperature of about 50° C. and a pH of about 7. Solid melamine is dissolved in a concentrated formaldehyde solution at room temperature. The pH of the reaction is adjusted to 9 by the addition of sodium hydroxide. The melamine is dissolved in the solution after 15 hours. The resulting solution is mixed with hexanol resulting in 50 barrels of a 2% formaldehyde and 2% melamine emulsion. The pH of the emulsion is readjusted to 9 with additional sodium hydroxide. The entire 50 barrels of the emulsion are then injected into the highly permeable, water-containing zone via the well in fluid communication with the zone at a rate of 200 barrels per day. The injected emulsion is prevented from migrating vertically into the hydrocarbon-bearing zone by the relatively less permeable intermediate zone. The emulsion preferentially migrates from the near well bore along the interface between the highly permeable water-containing zone and the relatively impermeable zone. Sixteen hours after injection a concentrated hydrochloric acid solution is injected into the water-containing zone until the pH of the fluid in the zone reaches 6. Steam at 120° C. is then injected into the upper zone via the well. A resin forms in situ upon contact with steam migrating to the interface, which substantially prevents further migration of steam into the highly permeable, water-containing zone. The steam is thereby diverted into the upper hydrocarbon-bearing zone to facilitate recovery of the hydrocarbon therefrom.

With the foregoing preferred embodiment of the invention has been described and shown it is understood that the alternatives and modifications, such as those suggested, and others may be made thereto, and fall within the scope of the invention.

What is claimed:

1. A process for selectively plugging a highly permeable zone of a subterranean formation vertically bounded by a relatively less permeable zone comprising the steps of:
   (a) dissolving a solid melamine in an aqueous formaldehyde solution to form a melamine/formaldehyde solution;
   (b) combining said melamine/formaldehyde solution with a monohydric or polyhydric alcohol comprising at least about 6 carbon atoms to form a substantially hydrophobic emulsion wherein the moles of said formaldehyde exceed the moles of said melamine;
   (c) injecting said emulsion into said highly permeable zone via a well in fluid communication with said highly permeable zone;
   (d) displacing said emulsion along the interface between said highly permeable zone and said relatively less permeable zone; and
   (e) reacting said emulsion in situ at the pressure of said subterranean formation, at a temperature of from about 80° C. to about 250° C. and for a time of from about 1 to about 4 days to produce a resin which is substantially impermeable to fluids and which substantially plugs said highly permeable zone.

2. The process of claim 1 wherein the molar ratio of formaldehyde to melamine is at least about 2:1 in said emulsion.

3. The process of claim 2 wherein the concentration of said melamine is from about 0.5% to about 10% by weight and said formaldehyde is from about 0.5% to about 10% by weight in said emulsion.

4. The process of claim 3 wherein the concentration of said melamine is from about 1% to about 2% by weight and said formaldehyde is from about 1% to about 2% by weight in said emulsion.

5. The process of claim 1 wherein the pH of said emulsion is adjusted from about 7 to about 12 prior to injecting said emulsion by adding a base to said emulsion.

6. The process of claim 5 wherein the pH of said emulsion is adjusted from about 8 to about 9 prior to injecting said emulsion by adding a base to said emulsion.

7. The process of claim 1 wherein the pH of water within said formation is adjusted to from about 7 to about 5 after the reaction of step (c) is initiated by injecting an acid into said formation.

8. The process of claim 7 wherein said acid is injected into said formation from about 12 to about 24 hours after said emulsion is injected into said zone.

9. The process of claim 1 wherein said emulsion is reacted at a temperature of from about 100° C. to about 200° C.

10. The process of claim 1 wherein said emulsion is reacted for a time of from about 1 to about 2 days.

11. The process of claim 1 wherein said solid melamine is dissolved in said aqueous formaldehyde solution under basic conditions.

12. The process of claim 1 wherein said highly permeable zone contains water.

13. A process for selectively plugging a highly permeable water-containing zone of a subterranean formation, said formation having a relatively less permeable zone substantially permeable to gases but substantially impermeable to liquids, bounded on one side by said highly permeable water-containing zone, and bounded on the other side by a second highly permeable zone, said process comprising the steps of:
(a) dissolving a solid melamine in an aqueous formaldehyde solution to form a melamine/formaldehyde solution;
(b) combining said melamine/formaldehyde solution with a monohydric or polyhydric alcohol comprising at least about 6 carbon atoms to form a hydrophobic emulsion wherein the molar ratio of formaldehyde to melamine is at least about 2:1;
(c) injecting said emulsion into said highly permeable water-containing zone via a well in fluid communication with said water-containing zone;
(d) displacing said emulsion along the interface between said highly permeable water-containing zone and said relatively less permeable zone;
(e) injecting steam into said second highly permeable zone via a well in fluid communication with said second highly permeable zone;
(f) displacing said steam across said relatively less permeable zone and along the interface betweentn said relatively less permeable zone and said water-containing zone; and
(g) contacting said emulsion with said steam at the interface at the pressure of said subterranean formation, at a temperature of from about 100° C. to about 250° C., and for a time of from about 1 to about 4 days to produce a resin substantially impermeable to said gases and liquids and which substantially plugs said highly permeable water-containing zone.

14. A process for steamflooding a highly permeable hydrocarbon-bearing zone of a subterranean formation to produce said hydrocarbon therefrom, said formation having a relatively less permeable zone substantially permeable to gases but substantially impermeable to liquids, bounded on one side by said highly permeable hydrocarbon-bearing zone and bounded on the other side by a highly permeable water-containing zone, said process comprising the steps of:
(a) dissolving a solid melamine in an aqueous formaldehyde solution to form a melamine/formaldehyde solution;
(b) combining said melamine/formaldehyde solution with a monohydric or polyhydric alcohol comprising at least about 6 carbon atoms to form a hydrophobic emulsion wherein the molar ratio of formaldehyde to melamine is at least about 2:1;
(c) injecting said emulsion into said highly permeable water-containing zone via a well in fluid communication with said water-containing zone;
(d) displacing said emulsion along the interface between said highly permeable water-containing zone and said relatively less permeable zone;
(e) injecting steam into said highly permeable hydrocarbon-bearing zone via a well in fluid communication with said hydrocarbon-bearing zone;
(f) displacing said steam across said relatively less permeable zone and along the interface between said relatively permeable zone and said water-containing zone;
(g) contacting said emulsion with said steam at the interface at the pressure of said subterranean formation, at a temperature of from about 100° C. to about 250° C., and for a time of from about 1 to about 4 days to produce a resin substantially impermeable to said gases and liquids and which substantially plugs said highly permeable water-containing zone; and
(h) steamflooding said highly permeable hydrocarbon-bearing zone to produce said hydrocarbon therefrom.

* * * * *

UNITED STATES PATENT AND TRADEMARK OFFICE
CERTIFICATE OF CORRECTION

PATENT NO. : 4,482,015
DATED : November 13, 1984
INVENTOR(S) : David O. Falk

It is certified that error appears in the above-identified patent and that said Letters Patent are hereby corrected as shown below:

Col. 3, line 43: Delete "alchol" and insert --alcohol--.
Col. 6, line 39: Delete "With" and insert --While--.
Abstract, line 6: Delete "are" and insert --and--.
Col. 8, line 8: Delete "betweentn" and insert --between--.

Signed and Sealed this

Sixteenth Day of April 1985

[SEAL]

Attest:

DONALD J. QUIGG

Attesting Officer  Acting Commissioner of Patents and Trademarks